Patented May 6, 1952

2,595,796

UNITED STATES PATENT OFFICE 2,595,796

COMPOSITIONS CONTAINING POLYVINYL ACETATE AND ALKYL-SUBSTITUTED UREA

Walter G. Kunze and Raymond Bertram Evans, Catonsville, Md., assignors to Le Page's Inc., Gloucester, Mass., a corporation of Massachusetts No Drawing. Application April 6, 1950, Serial No. 154,431

7 Claims. (Cl. 260—29.6)

This invention relates to emulsions of polymers which are suitable for use as coatings and as adhesives. It is particularly concerned with such an emulsion of polymers which is capable of providing a water-resistant bond or coating and which at the same time retains the stability, fluidity and the various other physical properties of such an emulsion which make it particularly useful as a coating or adhesive.

The use of melts and solutions of water insoluble artificial resins in the coating and adhesive art has been supplanted to a large extent by emulsions of such resins, particularly polyvinyl acetate emulsions, due to the improved ease, economy and safety with which aqueous emulsions of the resin may be employed. On the other hand, the usefulness of water insoluble polymer emulsions has been limited by the characteristic lack of water-resistance of the coatings and bonds deposited therefrom at room temperature and the tendency of such coatings and bonds to re-emulsify or disintegrate when subsequently brought into contact with water during the course of normal use of the object or article to which they have been applied.

This lack of water-resistance has been considered innate in the coatings and films deposited from such polymer emulsions inasmuch as water-soluble emulsifying and bodying agents are employed necessarily to establish and stabilize the emulsion. These agents are apparently carried into the film or bond deposited from the emulsion upon application of the emulsion to a surface, and actively exhibit the emulsifying effect on the polymer comprising the body of the coating or film and cause its redispersion when the surface is brought into contact with water.

Various proposals have been made to obviate the water-sensitivity of the coatings or bonds deposited from such emulsions, but in general these proposals have been directed to modifying emulsions of such polymers which have been prepared in a specific manner, or require treating the emulsion with certain diluents immediately prior to its application due to the recognized tendency of the suggested diluents to either break or gel the emulsion shortly after the addition of the diluent.

Prior to the instant invention, for example, a common expedient for increasing the water-resistance of a coating or film deposited from a water-insoluble polymer emulsion included the addition of a quantity of one or more substances such as dimethylol urea, trimethylol melamine, certain chromium salts, strong acids or highly reactive aldehydes such as glyoxal, certain resins, toluene and peroxides. In most instances it was required that the substances be added to the polymer emulsion immediately prior to use as the resulting compositions were unstable and certain of the substances resulted in a progressive increase in the viscosity of the emulsion until a gel was formed. Gelling rendered the composition unfit for use in adhesive applicator machines operated at high speed. Additionally, the modification effected by some of these substances did not result in a substantial improvement in the water-resistance of the coating or film deposited from the emulsion, and often imparted undesirable color and foaming characteristics to the emulsion.

Where thermo-plastic polymeric material has been employed, it has been suggested that the water-resistance of the coating or bond deposited from an emulsion of the material can be improved by heating the coating or bond sufficiently to cause coalescence of the material into a homogeneous mass. This procedure is obviously not suitable where the emulsion is employed as a quick-setting adhesive in high-speed mechanical applicators, and in any event the drying and heating suggested often makes the use of such emulsions economically prohibitive.

A further suggestion directed to retaining the advantages of working with the polymers in an aqueous medium and at the same time avoiding the inherent disadvantages of water-sensitivity of the coatings or films deposited therefrom required dispersing the polymer as extremely small particles. The coatings or films deposited from such emulsions do exhibit a satisfactory water-resistance, but due to the fine particle size which imparts the water-resistance, the emulsions do not have the tack necessary to make them useful as quick-setting adhesives.

It is an object of this invention to provide a composition comprising an aqueous emulsion of a polymer, particularly a polymer of vinyl acetate, alone or in combination with small quantities of other monomers, which is stable throughout long periods of storage, and which when employed as a coating or as an adhesive will deposit a coating or bond which is highly water-resistant.

A further object of the invention is to provide a process which is generally applicable to modify emulsions of polymers, particularly polymers of vinyl acetate, alone or in combination with small amounts of other monomers, which have been polymerized to different extents, or in different manners, and which include various combinations of plasticizers and other diluents commonly employed to develop favored characteristics in the films or coatings deposited from such emulsions.

We have discovered that the water-resistance of coatings or bonds deposited from an aqueous emulsion of polymers, particularly polyvinyl acetate emulsions, which are formulated, or modified, to have a tackiness rendering them suitable for use as quick-setting adhesives, can be established by additions of one or more of a certain group of organic compounds within specific limits. These active compounds are characterized by a particular balance between the parts of the monomeric molecule, one part of which is hydrophilic or polar in nature, and the other part of which is hydrophobic or non-polar. The effectiveness of the compounds in producing water-resistance in the coatings or bonds deposited from such emulsions is apparently due to the presence of both the polar and non-polar groups within the molecule in the prescribed balance.

As it has been generally recognized that the presence of water-soluble emulsifiers carried into the bonds and coatings deposited from emulsions of water-insoluble polymers may later cause redispersion and disintegration of the bonds and coatings, it was particularly surprising to find that incorporating into the emulsion additional compounds which are water-soluble themselves will nullify the effect of the water-soluble emulsifiers and thereby impart water-resistance to the coatings and films deposited from such emulsions.

For present purposes a polar or hydrophilic group or radical may be considered to be one which has a strong affinity for water and which when combined in compounds in which it is the dominant functional group will cause the resulting compound to be immiscible, or miscible to a limited extent, in oil-type solvents. A non-polar or hydrophobic group, on the other hand, may be considered to be one which has slight affinity for water and a strong affinity for oil-type solvents.

The urea residue of a substituted urea, for example, is representative of a polar group. The hydrocarbon chains may be classified as non-polar groups.

With regard to the substituted ureas which have the inter-molecular balance between polar and non-polar portions of the compound which make them effective in imparting water-resistance to a polyvinyl acetate emulsion, we have found that those which contain 5 to 11 carbon atoms and have some solubility in water are active. Included among the active compounds are butyl urea and the unsymmetrical di-substituted ureas such as 1,1, dibutyl urea and 1,1, diethyl urea. The symmetrically substituted ureas exhibit no water-solubility, and due to the substitution of a non-polar hydrocarbon chain in each amino group of the urea base, the compounds do not have an active polar group. Urea, on the other hand, is too hydrophilic in nature and is not effective for that reason. Ethyl urea is also inactive, apparently for the same reason. Nevertheless, certain mixtures of active and inactive compounds are effective in producing water-resistance where the proportion of active compound in the mixture is predominant. For example, a mixture compressing 70% butyl urea and the remainder urea is effective. One such mixture which is commercially available is known as "Buramine."

Some of the active compounds within the prescribed class have a relatively low solubility in water and effective quantities will not be easily solubilized by the external water phase of the emulsion. In the instances where the compounds are normally liquid this makes no material difference as such compounds are taken up or combined in a manner which makes them effective in producing water-resistance in the films deposited from the emulsion. Where the active compounds are normally solids they can be dissolved to obtain an effective concentration, and the solution thus formed mixed with the emulsion.

The preferred range of quantities of one or more of the active compounds by weight with respect to the solid content of the polyvinyl acetate emulsion has been found to be between about 4 to 25%.

The physical properties of a polyvinyl acetate emulsion such as the viscosity of the emulsion, and the tensile strength, flexibility and heat sealing temperature of the film or bond deposited from the emulsion are determined in a large part by the degree of polymerization of the vinyl acetate monomer. A higher degree of polymerization results in increased bond strength, a higher heat sealing temperature and a somewhat higher initial water-resistance, which is, however, considerably less than required commercially for a water-resistant coating or bond. A lesser quantity of the active compounds is necessary to impart the desired water-resistance to the deposited coatings or bonds when the relatively greater water-resistant emulsions are employed as a starting material. The age of the starting material emulsion also determines in part the susceptibility of the emulsion to water-proofing, the older emulsions, for example, emulsions 4 to 6 months old, show better water-resistance when treated than those freshly made.

For present purposes the polyvinyl acetate starting material emulsions having sufficient tack to be useful as quick-setting adhesives and suitable for improvement according to the instant invention may be classified according to their initial water-resistance although in each instance the water-resistance is negligible from the standpoint of minimum commercial requirements. Such emulsions generally contain about 50-60% polyvinyl acetate by weight and a dried bond produced by the respective emulsions between two sheets of mildly calendered white sulphite paper will open up within 24 hours after immersion in water at about 25° C. Such polyvinyl acetate emulsions include the commercially available emulsions known as Elvacet No. 80-900, Elvacet 81-900, Gelva S-50 and Polyco 117H, Polyco 117-SS and Polyco-289.

The physical characteristics of the commercially available polyvinyl acetate emulsions identified above may also vary to some extent as a result of the emulsifiers and bodying agents employed in producing the emulsions, and also as a result of particular plasticizers employed. In general, however, the variations which tend to increase the relative initial water-resistance of the starting material emulsions lessen the quantity of the active compounds required to effect complete water-resistance.

The amounts of active compound required to produce maximum water-resistance in a particular emulsion also varies with the quantity and the nature of the plasticizers, extenders, or other diluents which may be used to develop desired characteristics of fluidity or tackiness in the emulsion, or of flexibility, hardness, etc. in the coating or film deposited from the emulsion. In general, it has been found that the insoluble type of plasticizers and resins in common use increase the effectiveness of the active compounds, and that a lesser quantity of active compound is necessary to produce complete water-resistance when such plasticizers are also present in the emulsion. It should be noted, however, that in each instance the emulsion containing the plasticizers and various other diluents was not initially water-resistant and that the addition of the active compound is necessary to effect any satisfactory water-resistance, although as related above, a lesser amount is necessary when insoluble plasticizers are also present.

This enhancing effect of the insoluble plasticizers was particularly observed with respect to dimethyl phthalate, dibutyl phthalate, chlorinated diphenyls, methyl abiatate and tributyl phosphate, and appears to be characteristic of other common plasticizers such as di-carbitol phthalate, dibutoxy-glycol phthalate, dimethoxy-glycol phthalate, butyl phthalyl butyl glycolate, methyl phthalyl ethyl glycolate, triglycol di-2-ethylbutyrate, triglycol di-2-ethylhexoate, tricresyl phosphate and triphenyl phosphate.

On the other hand, the presence of a small amount of certain water-soluble thickeners such as polyvinyl alcohol and sodium carboxymethyl cellulose tend to increase the amount of active compound necessary to effect maximum water-resistance.

In some instances care must be exercised to avoid breaking the emulsion by sudden heating, or by extended heating above the temperature specified. The critical temperature will vary, of course, with the character of the particular starting material emulsion employed.

Aging the composition tends to increase the water-resistance of the coatings or films deposited therefrom.

It will be apparent from the foregoing that innumerable possibilities for formulating the instant water-resistance composition exist, and that the invention may be practiced to increase the water-resistance of any particular polyvinyl acetate emulsion without materially interfering with the versatility of the starting material emulsion. It will be noted, however, that any of the active compounds are effective in producing water-resistance when used in quantities within the range of 4-25% by weight of the solids present in the starting material polyvinyl acetate emulsion.

The minimum amount of a particular one of the active compounds depends upon the factors discussed above, but in all instances is within the range specified.

Compositions having up to 50% by weight of active compound with respect to the solid content of the polyvinyl acetate starting material emulsions may be employed, especially where the active compound has desirable plasticizing properties and the cost thereof is not prohibitive. In most instances, however, the maximum water-resistance is obtained with the least effect on other physical characteristics of the composition when a total of from 8-12% of active compound or compounds by weight of solids in the starting material emulsion are employed. In the event plasticizers are also used in formulating the composition the same effect can be achieved with slightly lesser quantities of the active compounds. Some of the numerous possibilities which exist in formulating a water-resistant composition within the operable limitations specified above are illustrated in the following examples.

The addition of the active compound to the starting material emulsion may result in a substantial increase in the viscosity of the emulsion to form a cohesive mass unless the active compound is added slowly with continuous agitation. In some instances rapid addition of the active compound results in localized precipitation of the emulsion. The largest part of the increased cohesiveness and viscosity of the emulsion caused by addition of the active compound at a suitable rate disappears on agitation, or when the treated emulsion is permitted to stand for a short period following the addition of the active compounds.

In all of the following examples the composition was prepared by stirring the starting material emulsion with a high-speed mixer continuously during the addition of the active compound thereto. The active compound was introduced into the emulsion at the rate of about 3% of the total weight of the active compound per minute.

Each of the tacky starting material polyvinyl emulsions was applied as a coating on the surface of a moderately calendered and sized white sulphite paper and as a bond between two such papers. The films and bonds thus formed were allowed to dry for 24 hours at room temperature and were thereafter immersed in water at room temperature for 24 hours. Upon removal from the water the wet strength of the paper exceeded the bond strength in all cases, and the bond ruptured when the bonded papers were separated. The coatings in each instance had visibly disintegrated. These starting material emulsions were, therefore, considered non-water-resistant, and in the subsequent experiments, satisfactory water-resistance of a film or bond formed from an emulsion treated with an active compound was considered fully indicated when the strength of the bond exceeded the wet strength of the paper after 24 hours immersion. It will be understood that the composition of the films and bonds deposited from the type of emulsion dealt with here is the same as that of the emulsion except for the external water phase which evaporates upon drying.

*Example 1*

Five samples were prepared by adding 3 grams of o-nitro biphenyl plasticizer and 3 grams of a dimethyl phthalate plasticizer to 110 grams of a polyvinyl acetate emulsion having about 55% solid content. 2, 4, 6, 8 and 10%, respectively, of butyl urea by weight of the solid content of the emulsions were added to these mixtures while the mixtures were stirred continuously with a high-speed mixer. The butyl urea was added in a 50% water solution.

A sixth sample was prepared as a control employing 110 grams of the polyvinyl acetate emulsion having about 55% solid content, 3 grams of o-nitro biphenyl plasticizer and 3 grams of a dimethyl phthalate plasticizer. Each of the samples was stirred until a homogeneous mass was obtained. All six of the samples were tested for water-resistance by applying each to a mildly sized and calendered white sulphite paper as both a film and a bond. The films and bonds were permitted to dry for 24 hours and were thereafter immersed in water at room temperature for 24 hours. At the end of this period the films and bonds deposited from the samples containing 4% or more of butyl urea by weight of the solid content of the starting material emulsion were found to be continuous and intact. The bonds deposited from these samples exceeded the wet strength of the paper so that when the bonded papers were separated the paper was torn. The films and bonds deposited from the control sample and from the sample containing 2% of butyl urea by weight of the starting material emulsion had visibly distintegrated, and the bonds fractured when the bonded papers were separated.

Example 2

A 50% solution of 1,1 diethyl urea in water was prepared. 30 parts of a dimethyl phthalate plasticizer was added to 550 parts of a polyvinyl acetate emulsion having about 57% solid content. The 1,1 diethyl urea solution was added slowly to the emulsion mixture which was stirred continuously with a high-speed mixer during the addition. The addition of the urea solution was continued until the 1,1 diethyl urea added was equal to 7½% by weight of the solid content of the starting material emulsion. Three additional samples were prepared in the same manner except the addition of the urea solution was continued until 8½%, 10% and 15%, respectively, of the 1,1 diethyl urea had been added. These samples were tested for water-resistance in the manner described in Example 1 and all were found to be waterproof.

Example 3

Four samples were prepared in the manner described in Example 2 using the same amounts of plasticizer and starting material emulsion except that 4%, 8%, 10% and 25%, respectively, of 1,1 dibutyl urea by weight of the starting material emulsion solid content was employed in place of the 1,1 diethyl urea additions as specified in Example 2.

These samples were tested for water-resistance in the manner described in Example 1. The films and bonds deposited from each sample were found to be continuous and intact after the 24 hour immersion. The bond strength in each case exceeded the wet strength of the bonded papers.

It will be apparent that the water-resistant compositions formulated according to the instant invention will considerably extend the usefulness of aqueous emulsions of polyvinyl acetate into the field in which high water-resistance of the bond or coating deposited is necessary, and will find application in bonding or cementing for cellulosic articles such as paper cups or paper bags which in the course of normal use are exposed to water, and for bonding surfaces of cellulosic material to other surfaces of a hydrophilic character such as masonry. These instant compositions are particularly adapted for use as a sizing where water-resistance of the fabric or the paper to which it is applied is required. It may also be employed in the composition of printing paste, as a finish for paper, paperboard, or foils and in the manufacture of formed or impregnated goods, as well as in distemper paints and the like.

Having thus described the invention, what is new and desired to be secured by Letters Patent is:

1. A composition comprising a tacky aqueous emulsion of polyvinyl acetate and 4–50% by weight of said acetate of a water soluble unsymmetrical alkyl substituted urea having from 5 to 9 carbon atoms, each carbon atom chain therein having less than 5 carbon atoms.

2. A composition comprising polyvinyl acetate and from 4–50% by weight of said acetate of a water soluble unsymmetrical alkyl substituted urea having from 5 to 9 carbon atoms, each carbon atom chain therein having less than 5 carbon atoms.

3. A composition comprising a tacky aqueous emulsion of polyvinyl acetate having a solid content of about 55% by weight, a plasticizer for said acetate, and 4–50% by weight of said acetate of a water soluble unsymmetrical alkyl substituted urea having 5 to 9 carbon atoms, each carbon atom chain therein having less than 5 carbon atoms.

4. A composition comprising polyvinyl acetate, a plasticizer for said acetate, and from 4–50% by weight of said acetate of a water soluble unsymmetrical alkyl substituted urea having from 5 to 9 carbon atoms, each carbon atom chain therein having less than 5 carbon atoms.

5. A composition comprising a tacky aqueous emulsion of polyvinyl acetate and 4–50% by weight of said acetate of unsymmetrical dibutyl urea.

6. A composition comprising a tacky aqueous emulsion of polyvinyl acetate and 4–50% by weight of said acetate of unsubstituted monobutyl urea.

7. A composition comprising a tacky aqueous emulsion of polyvinyl acetate and 4–50% by weight of said acetate of unsymmetrical diethyl urea.

WALTER G. KUNZE.
RAYMOND BERTRAM EVANS.

REFERENCES CITED

The following references are of record in the file of this patent:

UNITED STATES PATENTS

| Number | Name | Date |
|---|---|---|
| 2,025,044 | Dreyfus | Dec. 24, 1935 |
| 2,217,006 | Cordier | Oct. 8, 1940 |
| 2,444,396 | Collins et al. | June 29, 1948 |